United States Patent
Ortmann et al.

(10) Patent No.: US 7,261,671 B2
(45) Date of Patent: Aug. 28, 2007

(54) HYBRID VEHICLE POWERTRAIN WITH A MULTIPLE-RATIO POWER TRANSMISSION MECHANISM

(75) Inventors: Walt Ortmann, Saline, MI (US); Dan Colvin, Farmington Hills, MI (US); Bob Fozo, Westland, MI (US); Michael Encelewski, Northville, MI (US); Marvin Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 329 days.

(21) Appl. No.: 10/711,331

(22) Filed: Sep. 10, 2004

(65) Prior Publication Data

US 2005/0054480 A1 Mar. 10, 2005

Related U.S. Application Data

(60) Provisional application No. 60/501,706, filed on Sep. 10, 2003.

(51) Int. Cl.
*B60W 10/02* (2006.01)
*B60W 10/04* (2006.01)
*H02P 15/00* (2006.01)
*H02P 15/02* (2006.01)

(52) U.S. Cl. .................................. 477/6; 477/8; 477/9
(58) Field of Classification Search ................ 477/4–6, 477/8, 9, 12, 14, 15
See application file for complete search history.

(56) References Cited

U.S. PATENT DOCUMENTS

| | | | |
|---|---|---|---|
| 5,944,630 A * | 8/1999 | Omote | 477/5 |
| 6,176,808 B1 | 1/2001 | Brown et al. | |
| 6,193,628 B1 | 2/2001 | Hrovat et al. | |
| 6,482,125 B2 * | 11/2002 | Urasawa | 477/107 |
| 6,585,066 B1 | 7/2003 | Koneda et al. | |
| 6,629,026 B1 * | 9/2003 | Baraszu et al. | 701/22 |
| 2003/0019313 A1 * | 1/2003 | Ibamoto et al. | 74/339 |

* cited by examiner

*Primary Examiner*—Tisha Lewis
(74) *Attorney, Agent, or Firm*—David B. Kelley; Brooks Kushman P.C.

(57) ABSTRACT

A control method and system for a hybrid vehicle powertrain with an electric motor in a power flow path between an internal combustion engine and a multiple-ratio geared transmission. Motor torque, which is added to engine torque to obtain an effective transmission input torque, is modulated to achieve smooth power-on upshifts and coasting downshifts.

10 Claims, 11 Drawing Sheets

| FRICTION ELEMENT APPLICATION |||||||
|---|---|---|---|---|---|---|
| GEAR | RC | FC | DC | L/R | 2/4 | RATIO |
| 1ST |  | X |  | X |  | 1ST |
| 2ND |  | X |  |  | X | 2ND |
| 3RD |  | X | X |  |  | 3RD |
| 4TH |  |  | X |  | X | 4TH |
| REV | X |  |  | X |  | 2.310 |

X = ELEMENT TRANSMITS TORQUE

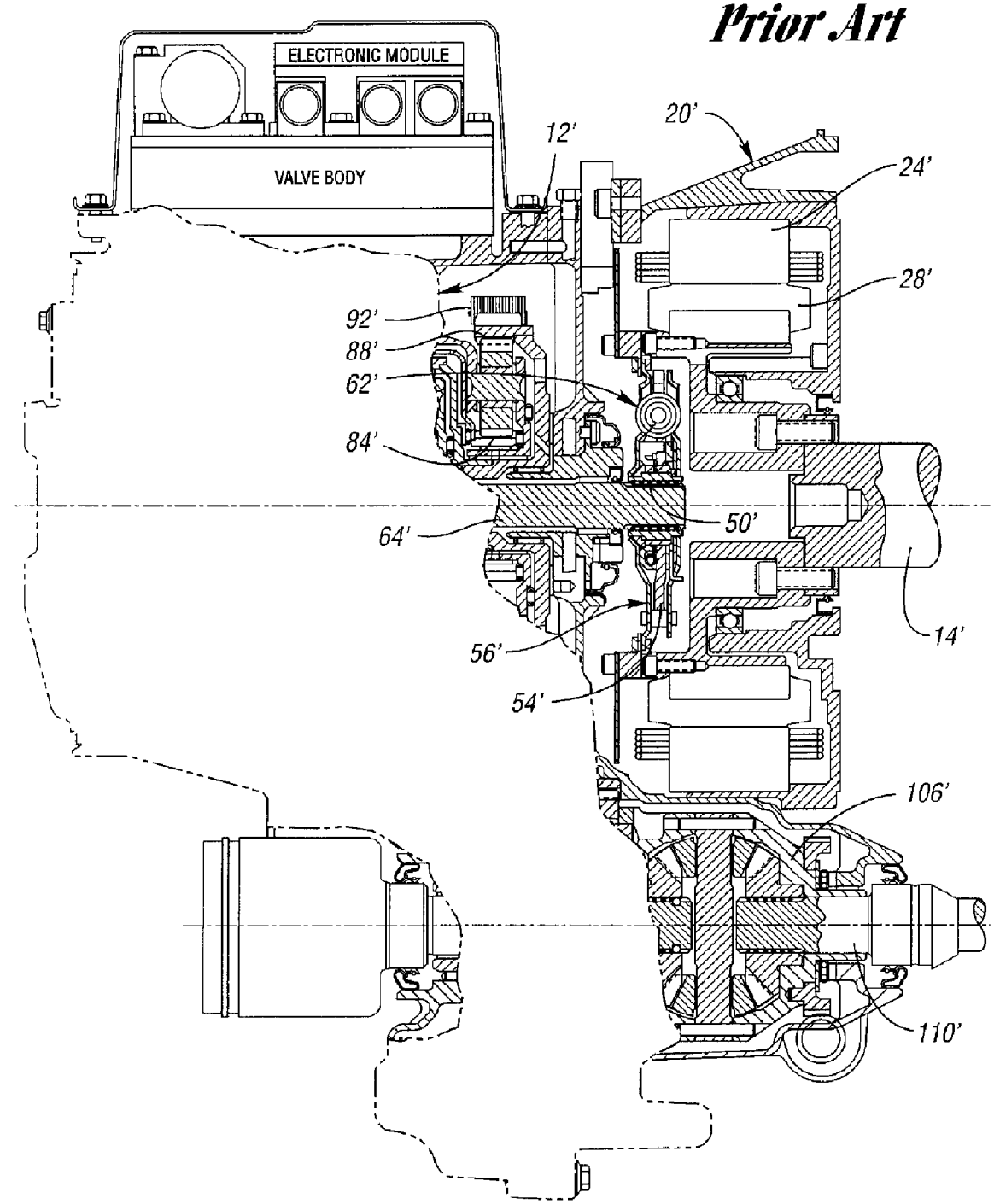

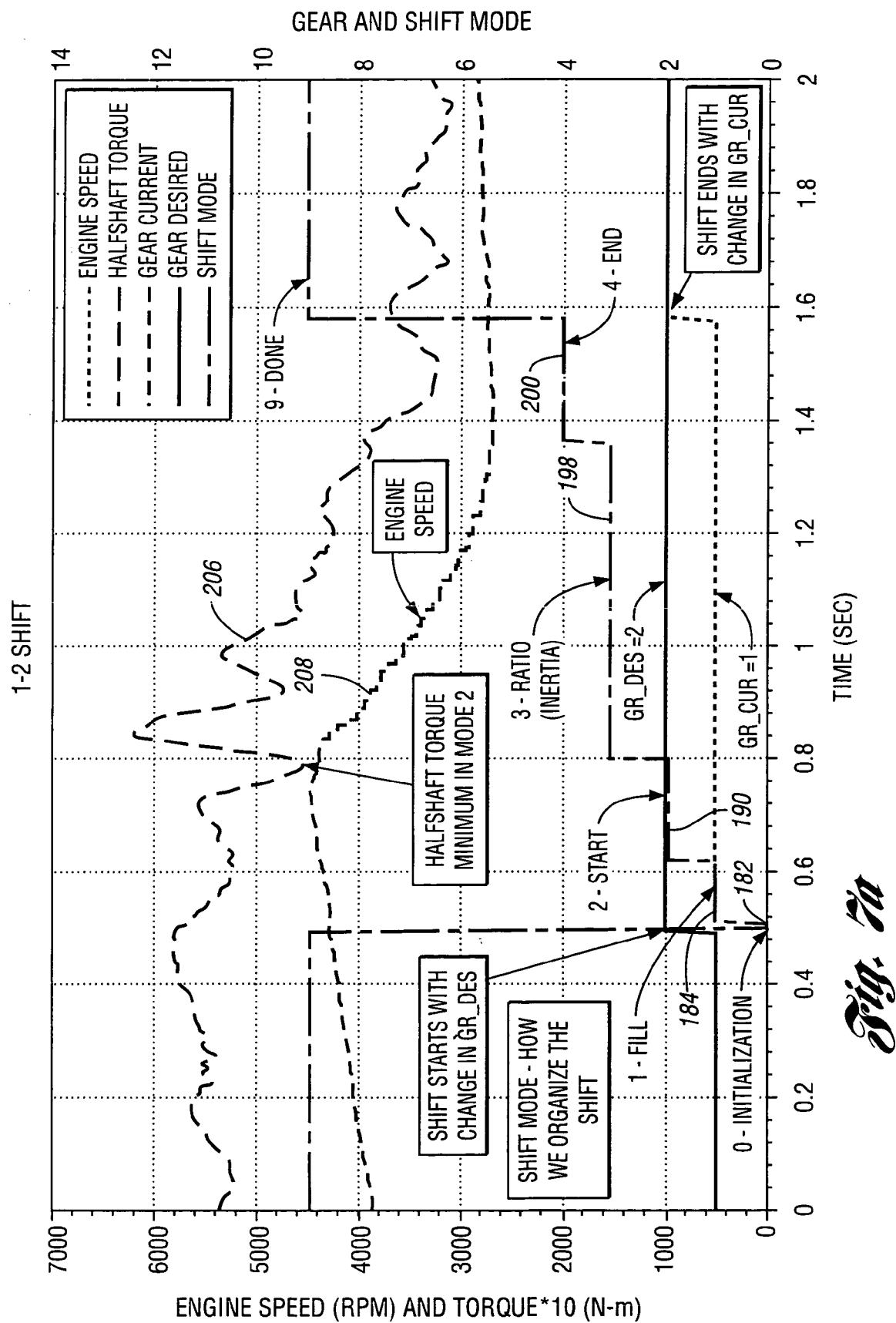

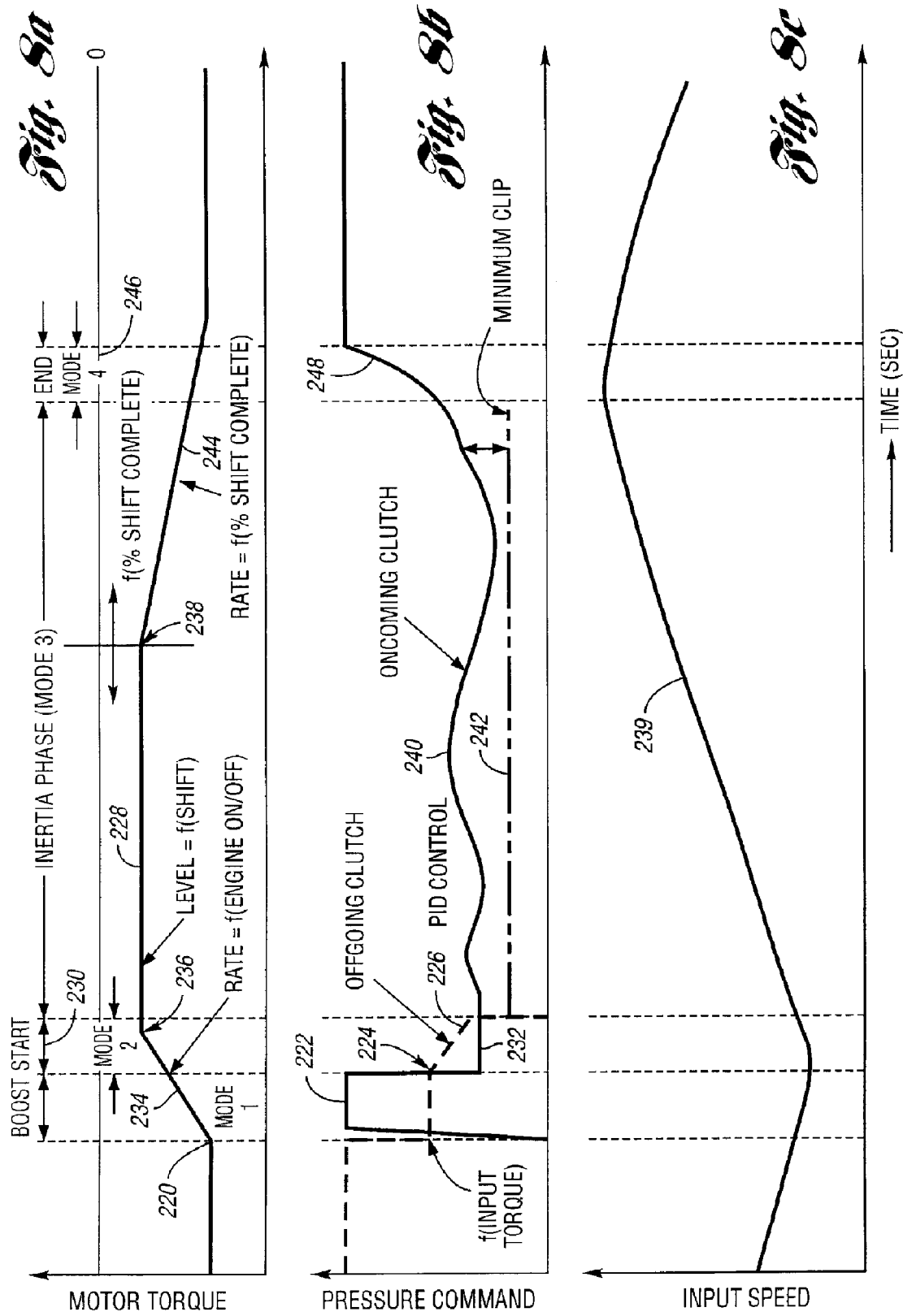

HYBRID VEHICLE POWERTRAIN WITH A MULTIPLE-RATIO POWER TRANSMISSION MECHANISM

CROSS-REFERENCE TO RELATED APPLICATIONS

This application claims the benefit of U.S. provisional application Ser. No. 60/501,706, filed Sep. 10, 2003.

BACKGROUND OF THE INVENTION

1. Field of the Invention

The invention relates to hybrid vehicle powertrains with an internal combustion engine, a multiple-ratio transmission and an electric starter/alternator motor between the engine and the transmission.

2. Background Art

A contemporary automotive vehicle powertrain typically includes a hydrokinetic torque converter disposed between a transmission with multiple-ratio gearing and an internal combustion engine. The turbine of the torque converter transfers power to the power input element of the multiple-ratio gearing.

The presence of the torque converter in a vehicle powertrain of this type introduces hydrokinetic power losses, particularly during vehicle start up and advanced throttle downshifts. The power losses are manifested by thermal energy build up in the hydrokinetic torque converter fluid, which requires a heat exchanger to maintain an acceptable fluid temperature. Attempts have been made to reduce power losses normally associated with torque converter automatic transmission by eliminating the torque converter and replacing it with an electric motor (starter/alternator). A powertrain configuration of this type takes advantage of the performance of an internal combustion engine with the advantages of an electric motor that complements the speed and torque characteristics of the engine. It improves fuel economy of the powertrain while reducing undesirable exhaust gas emissions. It also permits the engine to be deactivated when the vehicle is at rest. The motor, which could be a high voltage induction motor, is available to provide added performance. Further, the engine can be disconnected from the power flow path of the powertrain as the induction motor supplies driving torque. When the motor is not required for providing driving torque, it can function as an alternator.

Further, in a powertrain of this type, the kinetic energy stored in a moving vehicle can be collected by charging a high voltage battery during deceleration.

In a conventional powertrain with a hydrokinetic torque converter, shift quality may be improved by controlling transmission input torque. Transmission input torque is reduced during a power on upshift by retarding the engine spark to reduce engine output torque. This improves both the durability of the oncoming friction element and the smoothness of the upshift event. Torque modulation using spark retard will satisfy the timing and repeatability requirements to satisfy shift quality targets, but this wastes a small amount of energy during the shift that heats the exhaust gases. Further, it can only reduce torque, not increase it. Torque modulation also can be accomplished by using a fuel cut off to reduce engine torque, but restoring engine torque following a shift event often is not repeatable using fuel control.

In a conventional powertrain using a hydrokinetic torque converter, a coast mode occurs whenever the accelerator pedal is off, both with and without braking. As the vehicle slows, a coasting downshift must be done to keep the engine speed within the desired range. In the case of a coasting downshift for a hybrid electric vehicle, the regenerative braking function coincides with the coast mode. Since the motor is located between the engine and the transmission, the coast downshift is done with a significant level of negative torque at the input to the transmission. This is an operating condition that differs from a condition found in a conventional powertrain, where coasting downshifts are done with only a slight negative or positive torque at the transmission input.

SUMMARY OF THE INVENTION

The invention includes a strategy for controlling power-on upshifts and coasting, reduced-throttle downshifts in a multiple-ratio transmission for a converterless powertrain of the kind described in the preceding background discussion. The strategy uses a starter/alternator, sometimes referred to herein as a motor, in conjunction with control of transmission friction elements to provide smooth coasting downshifts that effect regenerative braking torque in the motor. The invention also includes a strategy that uses starter/alternator torque for torque modulation at the input of the transmission during an upshift.

The hybrid electric vehicle powertrain of the invention provides a significant improvement in fuel economy without sacrificing convenience and comfort associated with a conventional vehicle. The powertrain provides full hybrid characteristics including improved engine stops and starts, electric motor boost, regenerative braking and electric drive. The key components of the powertrain are packaged within a base transmission assembly wherein the torque converter of the base transmission assembly is removed and replaced with an electric high voltage motor that serves as a starter, an alternator and a hybrid traction motor. A clutch may be added between the motor and the engine to allow full electric drive capability. Transmission fluid is used to cool the motor, and the added clutch may be controlled with a traditional transmission electro-hydraulic system.

The invention provides active control of the transmission friction elements and coordinates that control with control of the motor. This results in torque modulation of shift events by reducing transmission input torque during a shift event.

During a power on upshift, the transmission ratio is changed to a ratio with lower torque multiplication. When the powertrain is producing positive torque at the wheels, the engine operating speed is lowered. This upshift normally is commanded by the strategy. It is not a reaction to a driver demand. Thus, high shift quality has added importance.

To improve shift quality, the change in the magnitude of vehicle acceleration and the derivative of the vehicle acceleration experienced during the shift is reduced. To achieve this reduction in acceleration change, the output torque should be as smooth as possible. During the shift event, the output torque is a function of several variables. Two variables that are of importance are the input torque and the torque capacity of the controlling element. The torque capacity of the controlling element, in turn, is a function of hydraulic pressure. This variable will be described first.

The input torque for the hybrid electric vehicle powertrain is the algebraic sum of the engine torque and the motor torque. A combination of hydraulic pressure control and motor torque control is used to smooth and shape the output torque during power-on upshifts. The shaping of the output torque reduces occurrences and severity of torque fluctuations or torque shuffle at the output shaft, which normally would be associated with elimination of the torque converter.

To schedule the pressure and torque computations and the output commands, a power-on upshift is divided into five modes. The first mode (Mode 0) is an initialization mode, which is called upon when the desired gear is not the same as the current gear. It is used to initialize variables for the start of the upshift. Mode 1 is then entered during the next mid-ground loop execution of a transmission microprocessor controller. This mode lasts for a predetermined fixed time. It is used to prepare the friction elements for pressure control. Mode 2, which is the torque phase of the shift, is entered after a fixed time for Mode 1 execution has expired. In Mode 2, the oncoming control pressure is commanded to ramp from a pressure that is a function of input torque and speed to an initial shift pressure. This pressure ramp is used to control the rate of pressure increase for the oncoming friction element. Triggers are monitored to indicate when the oncoming element has sufficient capacity to allow the release of the off-going element. At this point, the off-going friction element pressure is commanded to a predetermined clutch stroke value. Mode 2 is complete after a percent of ratio change completion has exceeded a predetermined trigger value or a set time has expired.

Mode 3, which is the inertia phase of the shift, involves a major portion of the speed ratio change interval. In Mode 3, a PID controller, based on a comparison of the desired oncoming slip speed and the actual oncoming slip speed, generates an oncoming friction element pressure command. This closed loop pressure control is calibrated so that the shift rate is initially high. It then is decreased as the shift pressure is reduced during the inertia phase. The reduced torque capacity and the resulting reduced deceleration is used to reduce the severity of an end shift shock that can cause torque shuffle after the shift is completed.

Mode 4 is entered when the percent shift complete exceeds a predetermined value. In Mode 4, the pressure is increased to the value required for non-shifting operation.

The other variable that is controlled during a power-on upshift, as mentioned above, is the transmission input torque. In a conventional automatic transmission, input torque is reduced during a power-on upshift, as previously mentioned, by retarding the engine spark to reduce engine output torque.

The motor in the powertrain of the invention has the ability to provide significant positive torque and regenerative torque with a relatively quick response time. Motor control strategy is implemented using the 5 shift modes corresponding to the shift modes for the pressure control. In Mode 1, the maximum value of torque the motor will be commanded to absorb is determined as a function of pedal command. In Mode 2, the motor is commanded to start battery charging after start of the speed change is sensed. The input torque reduction is commanded at an optimum time in the shift interval to avoid reducing the minimum torque during Mode 2, which would reduce shift quality.

A shaping function, stored in microprocessor memory, is used to determine the actual level of the torque that the motor is commanded to absorb. In Mode 3, as the shift progresses, the motor is commanded to absorb less torque (i.e., to supply less negative torque) thereby restoring the transmission input torque to its unmodulated value by the end of the shift. The increasing input torque reduces the shift rate at the end of the shift, thereby further mitigating the torque shuffle problem at the torque output shaft of the transmission.

In the case of a coasting downshift, the regenerative braking function coincides with the transmission coast mode. Because the motor is located in the powertrain between the engine and the transmission, the coast mode has a significant level of negative torque at the input for the transmission. From a regenerative braking perspective, it is desirable to have the transmission solidly in gear so that the maximum amount of energy can be collected. This requires the transmission to complete the shift in a short period of time. Also, because of the regenerative braking, the coasting downshift is done with a variable and significant negative input torque. The requirements for short shift times and the high level of negative torque delivered to the transmission cause the shift to be more of a challenge than a coasting downshift in a conventional powertrain.

The smooth coasting downshifts maintain regenerative braking torque in the motor in a manner that resembles a so-called "mirror image" of a power-on upshift. The 5 modes of a power-on upshift, previously described, are used also in a coasting downshift.

The strategy for a coasting downshift requires a desired shift time that is dependent on the rate at which the vehicle is decelerating. Faster shifts are required during fast braking rates in order to avoid a condition in which one shift is stacked on top of another. Further, the required change in engine speed depends on the vehicle deceleration rate. For a coasting downshift, the change in vehicle speed during the shift can be significant under high vehicle deceleration rates. Since the vehicle deceleration rates can be very different under different operating conditions, the strategy takes vehicle deceleration rate into account.

The torque of the motor during a coasting downshift is increased before the start of the inertia phase to keep the transmission input from decelerating. It also is desirable to not completely bring the motor torque back to where it was at the beginning of the coasting downshift as the vehicle system controller normally commands less regenerative torque in lower gears (higher torque multiplication ratios). Less motor torque is desirable in lower gears since the transmission output torque should be consistent before and after the shift to maintain good braking feel.

As mentioned earlier, a coasting downshift event is characterized by 5 different modes, as in the case of the power-on upshift. The first mode (Mode 0) is an initialization mode, which is called upon when the desired gear is not the same as the current gear. It is used to initialize variables for the start of the upshift. The coasting downshift continues in Mode 1 with the oncoming friction element being boosted to fill the friction element actuator quickly while the off-going friction element pressure is set to a value just sufficient to hold input torque. In Mode 2, the oncoming element is set to its desired value as it completes its stroke. The off-going element is ramped down. The off-going element holds the transmission in its current torque ratio while the oncoming element is stroking. Then the off-going element is released and the oncoming element can control the transmission input speed up to the new speed ratio.

The motor produces negative torque, but it is controlled to a lower absolute level during the shift in such a way that it acts in a fashion that is the opposite of torque modulation during a power-on upshift. The torque is increased from its level before the shift to a predetermined level during the shift through a ramp function. This ramp is started in Mode 1 and continues until a desired torque value is reached at a predetermined value, or until the motor torque is requested to return near the completion of ratio change.

Once a predetermined percentage of a coasting downshift is completed, Mode 2 is complete. In Mode 3, which is the inertia phase, the oncoming pressure is commanded through a closed loop PID controller to follow a speed profile to the downshifted gear. The output pressure command of the PID control is prevented from going below a minimum value (clip). A change to an increased minimum clip on the pressure command makes the shift more aggressive under two conditions: First, for a manual downshift it is desirable to have an aggressive feel so that the vehicle noticeably slows in response to the driver's desire for hill braking; and secondly, under a fast vehicle deceleration rate, the shift is completed faster and a more aggressive shift rate is acceptable.

Motor torque is expected to be at the level desired to complete the ratio change. As the shift is progressing toward completion, the motor torque is ramped back toward the original torque level that was commanded at the start of the shift. The point at which the ramp is begun is a function of percentage shift complete. To make the ramp independent of the vehicle deceleration rate, the ramp rate is also a function of percentage shift complete. Mode 3 is exited when the shift percentage complete is near 100%.

In Mode 4, the oncoming pressure command is increased to a maximum command at the completion of the shift. Motor control is then returned by the transmission controller to the vehicle system controller. If there is a mismatch at that time between the motor torque command after the shift and the new desired regenerative braking torque command by the vehicle system controller, the command is filtered through a first order filter to the new level.

BRIEF DESCRIPTION OF THE DRAWINGS

FIG. 2 is a partial cross-sectional view of a hybrid vehicle powertrain embodiment similar to the embodiment of FIG. 1, although in FIG. 2 a slipping wet clutch connection between the engine and the torque input element of the multiple-ratio transmission is lacking;

FIG. 7a is a time plot showing engine speed, output torque, transmission gear and shift mode during a power-on upshift event;

FIG. 8a is a time plot of motor torque during a coasting downshift;

FIG. 8b is a time plot of the pressure command on the off-going clutch and the oncoming clutch during a coasting downshift;

FIG. 8c is a time plot of the input speed for the transmission during a coasting downshift;

DETAILED DESCRIPTION OF THE PREFERRED EMBODIMENT(S)

Figure 1:
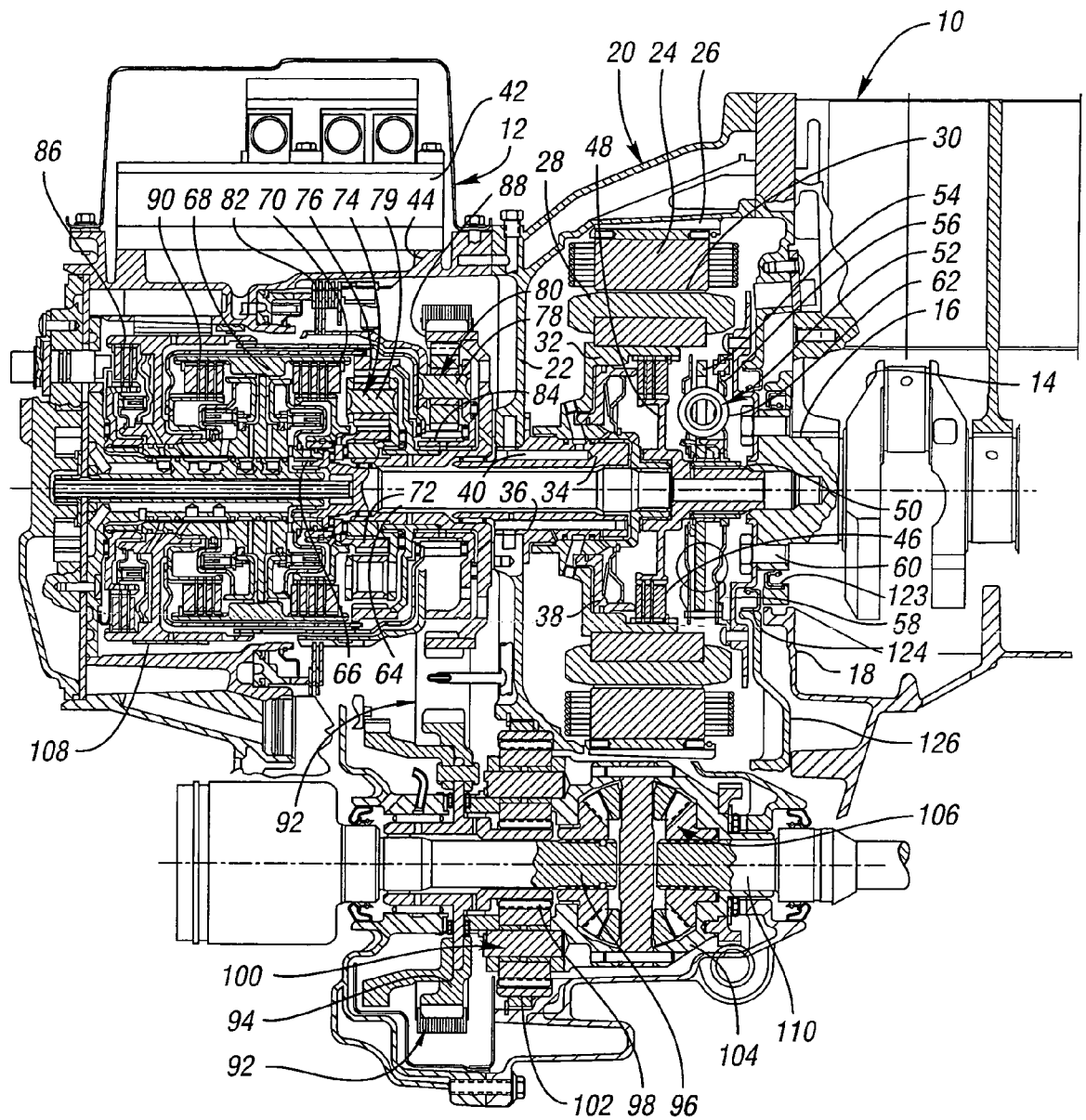
FIG. 1 is a cross-sectional view of a hybrid vehicle powertrain comprising an engine, a multiple-ratio transmission and an electric motor, the motor being located between the transmission and the engine.

In FIG. 1, reference numeral 10 designates schematically an internal combustion engine for an automotive vehicle. Numeral 12 designates generally a multiple-ratio automatic transmission.

The engine 10 includes a crankshaft 14 journalled at 16 in end wall 18 of the engine housing. An intermediate housing 20 is located between the end wall 18 of the engine 10 and wall 22 for the transmission 12.

The intermediate housing encloses a stator 24 of an electric motor. The stator and the stator windings are secured to an interior machined surface 26 of the housing 20. A rotor assembly 28 is situated within the stator and separated from the stator by an air gap designated by numeral 30.

A wet clutch cylinder 32 is secured to the rotor assembly 28. A support bearing shaft 34 rotatably supports the clutch cylinder 32 and is secured by bolts 36, or by other suitable fastening techniques, to the transmission wall 22.

An annular piston 38 situated within the clutch cylinder 32 cooperates with the cylinder to define a pressure chamber in communication with fluid pressure passage 40 in the support shaft 34. Passage 40 communicates with passage structure extending to a control valve body, shown generally at 42, which is secured to the upper side of transmission housing 44.

A slipping wet clutch disc assembly 46 has clutch plates secured to cylinder 32. Internally splined clutch discs are carried by clutch element 48, which in turn is connected, preferably by drive splines, to the hub 50 of a spring damper assembly 52. A damper drive plate 54 is connected directly to the hub 50. Damper housing 56 is connected directly to crankshaft drive plate 58. The hub of drive plate 58 is secured directly, preferably by bolts 60, to the end of crankshaft 14.

Damper springs 62 are situated between the damper drive plate 54 and the damper housing 56. They are arranged in a circular fashion about the axis of the hub 50, thereby providing a resilient connection between the crankshaft and the clutch element 48 in known fashion.

The torque input shaft for the transmission is shown at 64. Although the transmission illustrated in FIG. 1 can be used in the hybrid powertrain of the invention, other gearing arrangements also can be used to provide forward driving torque flow paths and a reverse ratio torque flow path. The gearing arrangement for the embodiment of FIG. 1 is similar to the gearing arrangement illustrated in U.S. Pat. No. 4,938,097 (S. L. Pierce), which is assigned to the assignee of the present invention.

Torque input shaft 64 is connected through a drive spline 66 to clutch cylinder 68 for forward drive friction clutch 70. When clutch 70 is engaged, a driving connection is established between shaft 64 and sun gear 72 of a first planetary gear unit 74. A ring gear 76 is connected driveably to carrier 78 of gear unit 80. Carrier 78 is adapted to be braked by selectively engageable low-and-reverse brake 82.

A sun gear 84 is connected driveably to the transmission torque input shaft 64 through a reverse clutch 86. The ring gear 88 of the gear unit 80 is driveably connected to the carrier 79 for the gear unit 74.

A direct-drive clutch assembly 90 connects the torque input shaft 64 with the clutch cylinder 68. Clutch cylinder 68 also is connected to the sun gear 72 through the clutch 70, as mentioned earlier. Clutch 90 also connects the shaft 64 to the ring gear 76.

The ring gear 88 of gear unit 80 defines a sprocket for a chain drive, indicated generally at 92. The driven sprocket of the chain drive, shown at 94, is rotatably mounted in the transmission housing on the axis of torque output shaft 96. It is connected driveably to a sun gear 98 of final drive gearset 100. The ring gear 102 of the final drive gearset 100 is connected directly to the transmission housing.

The carrier of the gearset 100 is connected to differential carrier 104 of a differential gear unit 106. Differential pinions are carried by the carrier 104. They mesh driveably with side gears carried by torque output shaft 96 and a companion output shaft 110. Each output shaft is connected to vehicle traction wheels through a universal joint assembly and axle half-shafts, not shown.

A friction brake band 108 surrounds a brake drum that forms a part of the reverse clutch 86. The brake drum is connected driveably to sun gear 84 of gear unit 80.

Figures 1A, 1B:
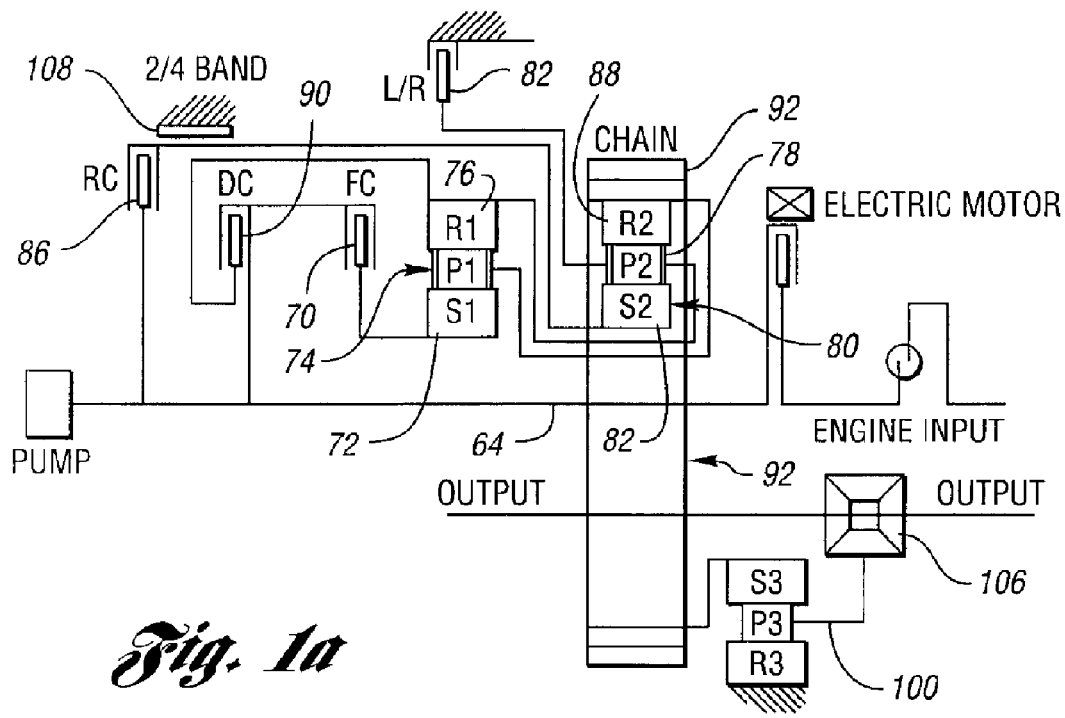
FIG. 1a is a schematic diagram of the elements of the power transmission mechanism of FIG. 1.
FIG. 1b is a chart showing the clutch and brake engagement and release pattern for each of four forward driving ratios and a reverse ratio for the transmission of FIG. 1.

FIG. 1*b* shows a clutch and brake engagement and release sequence to establish four forward-driving ratios and a single reverse ratio. The clutches and brakes are identified in FIG. 1*b* by the symbols RC, FC, DC, L/R and ⅔, which indicate, respectively, the reverse clutch 86, the forward clutch 70, the direct clutch 90, the low-and-reverse brake 82 and the brake band 108. The symbols R, S and P (with appropriate subscripts) in FIG. 1*a* identify the ring gears, the sun gears and the planetary pinion carriers, respectively.

To establish the first gear ratio in the forward-drive range, the forward clutch FC and the low-and-reverse brake L/R are engaged. The forward clutch remains applied for operation in each of the first three forward-driving ratios.

A ratio change to the second forward-driving ratio is obtained by applying brake band ⅔ and releasing brake L/R. An upshift to the third ratio is achieved by releasing brake band ⅔ and applying clutch DC. Fourth ratio, which is the top forward-drive ratio, is achieved by releasing the forward clutch FC and applying reaction brake ⅔.

Reverse drive is obtained by simultaneously applying reverse clutch RC and low-and-reverse brake L/R.

An alternate embodiment of the transmission is illustrated in partial cross-sectional form in FIG. 2. A principal difference between the design of FIG. 2 with respect to the design of FIG. 1 is the lack of a wet clutch in the design in FIG. 2 comparable to the wet clutch 46 of the design of FIG. 1. Because of the similarities in the design, the gearing system of FIG. 2 has been omitted in view of the complete description herein of FIG. 1. Common elements of the design of FIG. 2 with respect to the design of FIG. 1 have been indicated by the same reference numerals, although prime notations are used with the numerals used in FIG. 2.

In both of the designs of FIGS. 1 and 2, the torque input shaft of the transmission is connected mechanically to the engine crankshaft through a damper assembly. This differs from a conventional transmission wherein the connection between the gearing torque input shaft and the engine crankshaft is established by a hydrokinetic torque converter.

Figure 3:
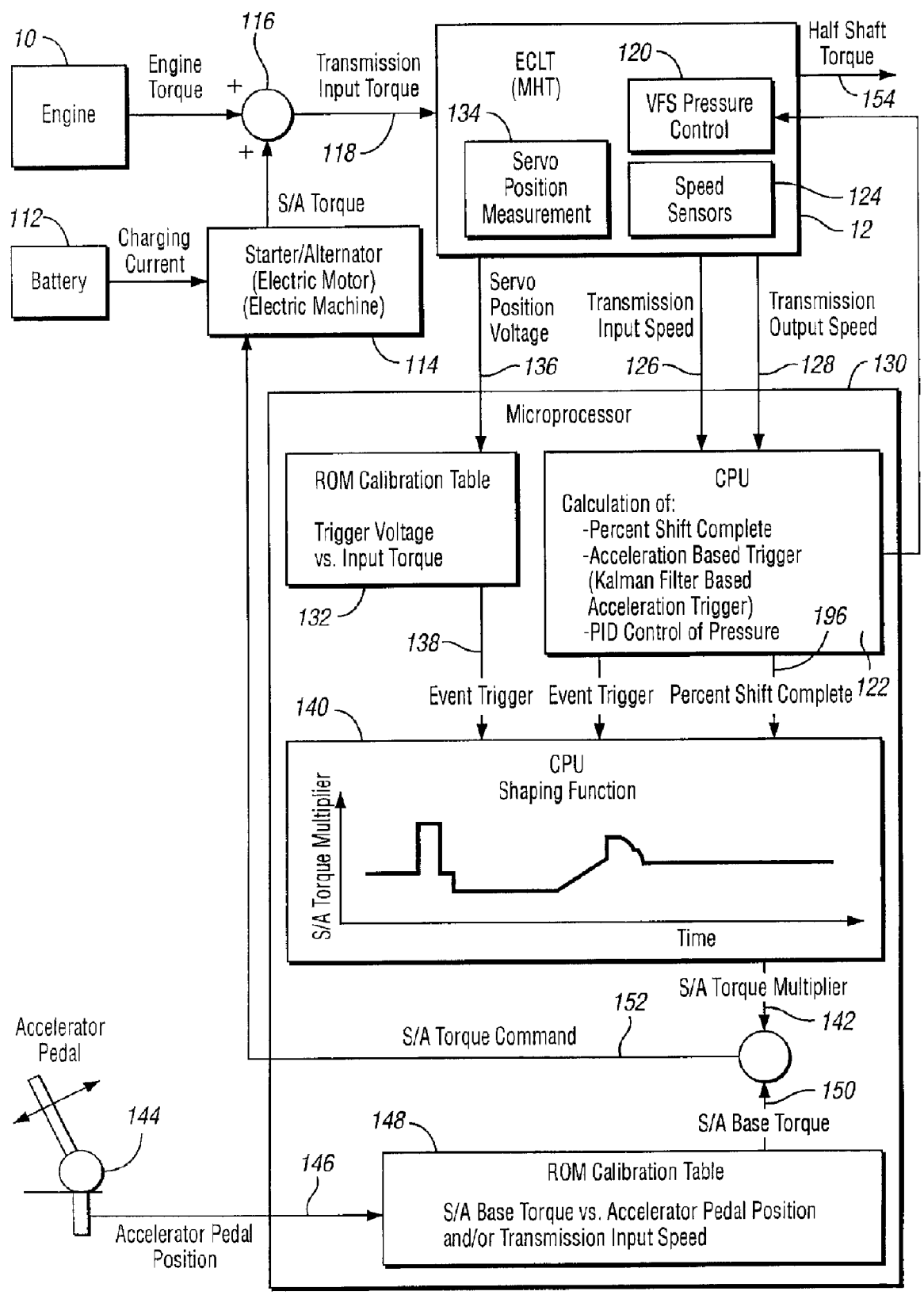
FIG. 3 is a schematic representation of an overall control system for controlling a hybrid powertrain of the type shown in FIGS. 1 and 2.

FIG. 3 is a schematic diagram of the overall transmission and starter/alternator control system. This control system is dedicated to the control of the transmission and starter/alternator, but it does not illustrate the vehicle system controller previously mentioned. Before the start of the shift, which is controlled by the control system schematic illustrated in FIG. 3, the vehicle system controller commands the torque level for the motor based on the desired regenerative braking torque during a coasting downshift. Having determined the motor torque level, the control system of FIG. 3 proceeds to control power-on upshifts and coasting downshifts throughout the 5 modes previously described. At the end of a coasting downshift, the control of the motor is returned to the vehicle system controller.

FIG. 3 schematically illustrates the internal combustion engine at 10. A high voltage battery 112 acts as a storage medium for storing electrical energy generated by the starter/alternator 114. Torque developed by the starter/alternator is distributed to a summing point 116, where it is algebraically combined with engine torque to develop a transmission input torque at the mechanical torque flow path 118.

The multiple-ratio transmission for the hybrid electric vehicle powertrain is shown at 12. It includes servo-operated friction clutches and brakes, as previously described with reference to FIGS. 1 and 2. It includes also a variable force solenoid pressure control 120, which is supplied by a pressure controller associated with a central processing unit (CPU) 122.

Speed sensors 124 in the transmission 12 measure transmission input speed and transmission output speed. Those speed values are transferred through signal flow paths 126 and 128, respectively, to the CPU 122.

The CPU 122 is part of a microprocessor 130, which includes a read-only memory (ROM)132 containing a calibration table with which an event trigger can be obtained as a function of input torque. A servo-position measurement mechanism can form a part of the transmission 12, as shown at 134, to effect a servo-position voltage signal at 136. The voltage signal can be an indicator of ⅔brake torque capacity and may be used to develop an event trigger voltage at 138 to establish the beginning and end of shift modes. An example of a device for sensing friction element torque capacity, based upon servo-position measurement, can be seen by referring to U.S. Pat. No. 6,110,068, which is owned by the assignee of the present invention. Other mechanisms, however, could also be used for establishing a trigger voltage at 138.

The microprocessor 130 includes a memory portion that contains a starter/alternator torque multiplier as a function of time. This is indicated at 140. The CPU uses the information at 140 to establish a starter/alternator torque multiplier signal at 142.

An accelerator pedal position sensor illustrated at 144 develops an accelerator pedal position signal in signal flow path 146, which is received by ROM calibration table 148 in microprocessor 130. Accelerator pedal position may use the calibration table at 148 to develop a starter/alternator base torque signal at 150. In the alternative, a starter/alternator base torque signal can be determined using transmission input speed as a variable.

The starter/alternator base torque signal at 150 is multiplied by the multiplier at 142 to develop a starter/alternator torque command at 152, which is distributed to the starter/alternator 114. Starter/alternator torque, as previously mentioned, is used to develop transmission input torque. Transmission output torque for driving the vehicle traction wheels is shown at 154.

Although FIG. 3 illustrates a transmission controller that is separate from the vehicle system controller, an integrated controller for the engine, the transmission and other vehicle systems could be used if that is desired.

Various computer readable media, including random access memory, read-only memory and functional software instructions, as well as the manner in which information is stored in the media may be implemented, are well known in the art. The various functions are implemented by the CPU using the stored instructions or algorithms, which are executed repetitively by the microprocessor in known fashion.

Strategy for Implementing Torque Modulation During a Power-On Upshift

Figure 4:
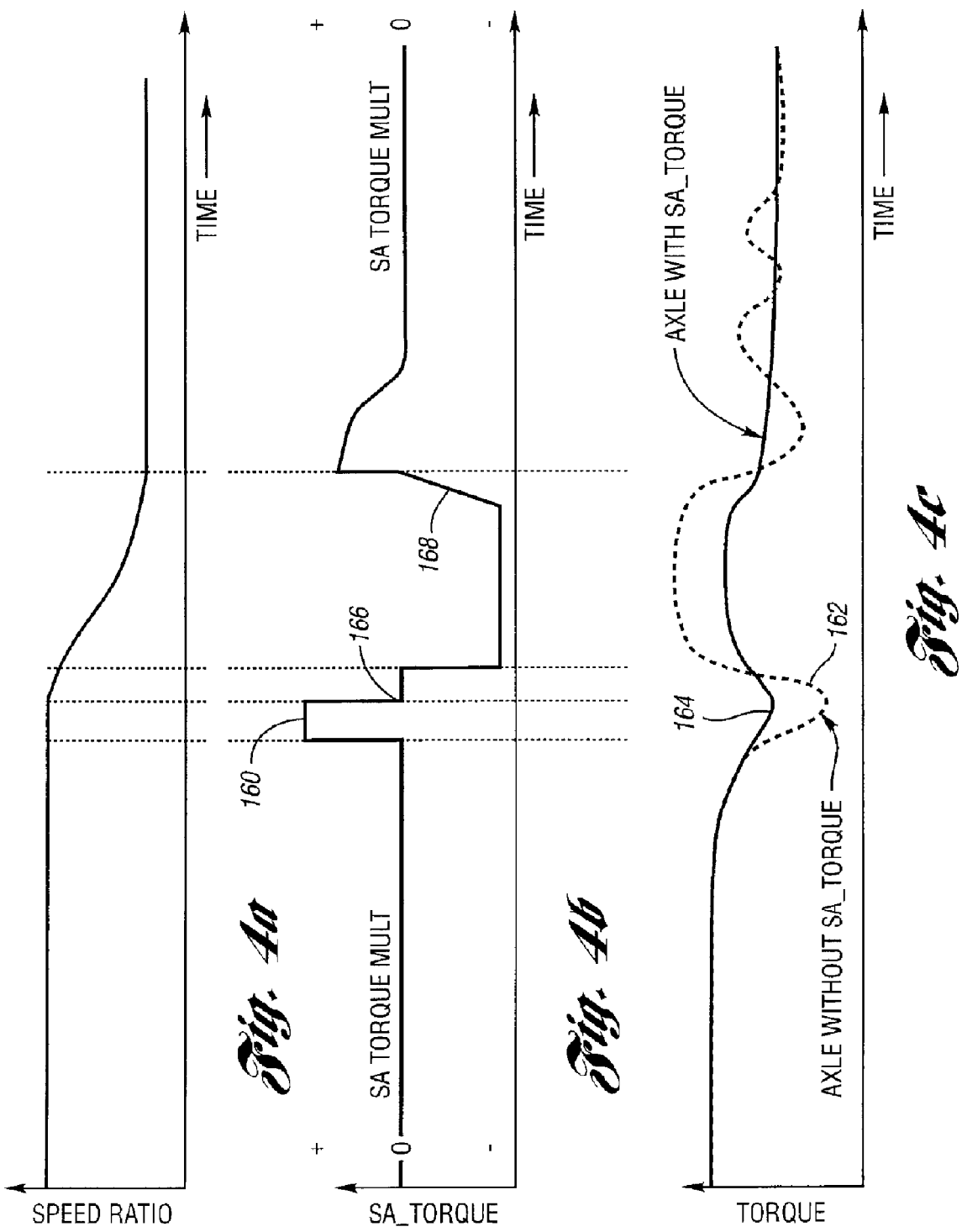
FIG. 4a is a time plot for the speed ratio during a power-on upshift event.
FIG. 4b is a time plot of the starter alternator torque during a power-on upshift event.
FIG. 4c is a time plot of the torque at the powertrain output shaft during a power-on upshift event.

The strategy for achieving a smooth power-on upshift is an open loop strategy that uses event-based triggers to change, start, or stop the various events during execution of a power-on upshift. FIG. 4a shows a variation of speed ratio during a power-on upshift event. FIG. 4b shows the starter/alternator torque multiplier, the information for which is retrievable from memory 140 of the microprocessor 130.

The output torque is shown in FIG. 4c plotted against time. The starter/alternator provides a significant torque with a relatively quick response time.

Figure 5:
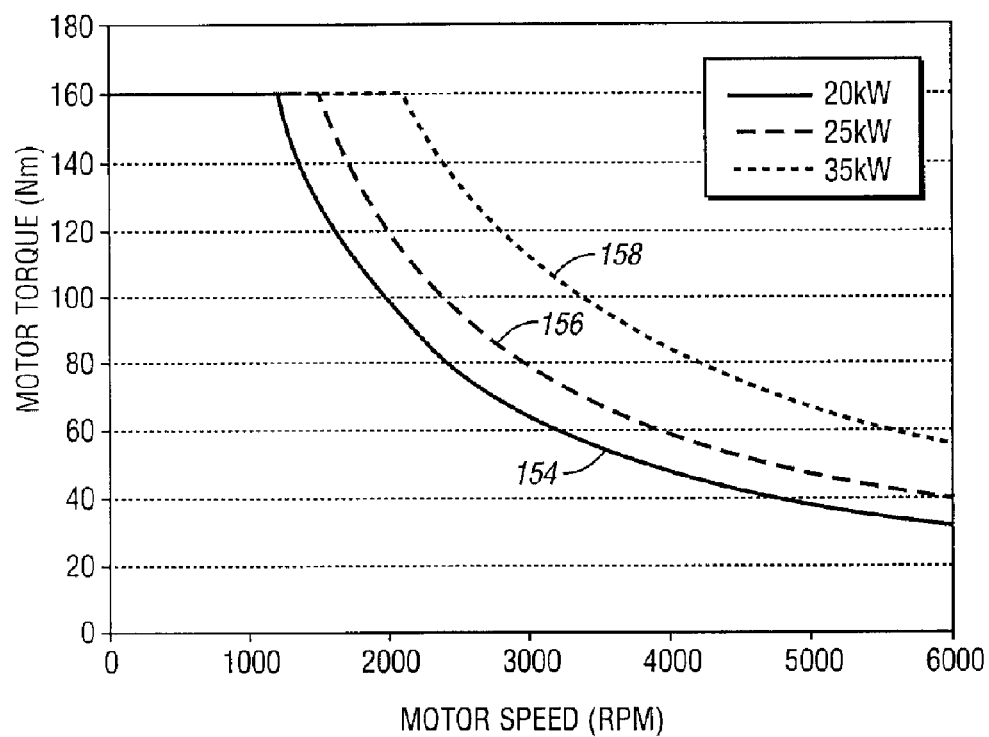
FIG. 5 is a time plot of motor torque and the motor-speed characteristics for a high voltage induction motor of the kind adaptable for use in the powertrain of the invention.

The torque capability for the motor is plotted in FIG. 5 for a typical embodiment of the invention. In FIG. 5, three different power levels are plotted for illustration purposes. A motor torque plot for a 20 kw motor is shown at 154. The corresponding plot for a 25 kw motor is shown at 156. A 35 kw motor plot is shown at 158.

There are three distinct portions of a power-on upshift strategy in which the starter/alternator can be used to improve shift quality. The torque multiplier has a high value during the torque phase of the shift, as shown at 160 in FIG. 4b. During the torque phase, the torque ratio across the transmission changes from a low gear to a higher gear. During this process, the output torque reduces to the next torque ratio times the input torque. This defines the start of a torque hole. This is indicated in FIG. 4c at 162.

During the torque phase at 160, the strategy of the invention will reduce the severity of the torque hole 160, as shown at 164 in FIG. 4c. This is done by increasing the input torque commanded using the torque multiplier value at 160. The plot at 162 shows the variation of output torque when the strategy of the invention is not used. The improvement is apparent when the decrease in the torque level at 164 is compared to the decrease in the torque level at 162. The torque disturbance (fluctuations) or shuffle at the output shaft thus is significantly less noticeable to the driver.

The starter/alternator command is set to zero at the termination of the torque phase at point 166.

In implementing this control strategy, the start of the torque phase must be detected. This can be done by using a position sensor 134 described with reference to FIG. 3. The torque phase start can be detected also using a so-called Kalman filter-based acceleration trigger.

The output torque is reduced to the second gear level. The engine speed then is pulled down toward the second gear speed. This results in inertia torque that defines the end of the torque hole shown at 162. An acceleration trigger can be used to reduce the effects of the torque hole by releasing the off-going element at the appropriate time so that the amplitude of the torque disturbance will be minimized.

During the inertia phase, it is usual practice to reduce the input torque of a powertrain by retarding the spark of the engine, as previously explained. The starter/alternator makes it unnecessary to resort to a spark reduction method to achieve input torque reduction. During the inertia phase, the engine torque is not altered.

The total transmission input torque is the sum of the engine torque and the starter/alternator torque. The starter/alternator torque is commanded to absorb torque to reduce the total transmission input torque level during the inertia phase. When the inertia phase has begun, the commanded starter/alternator torque is set to a calibrated value, which, as previously explained, can be a function of accelerator pedal position or input speed. This value is multiplied by the torque multiplier of FIG. 4b, which provides shaping of the starter/alternator torque command to ease back the transition of the starter/alternator torque, before the end of the shift, to where it was at the start of the shift. Using starter/alternator torque modulation in this fashion, rather than a spark retard on the engine, improves the efficiency of the powertrain by storing energy in the vehicle battery 112 instead of wasting it as heat energy.

At the end of the shift, the oncoming clutch stops slipping, which causes an abrupt change in the kinematic state of the transmission. The torque carried by the clutch changes instantly when the clutch stops slipping so that the value of the torque is significantly greater than the torque carried by a slipping clutch, which is a function of pressure. A quick change in clutch torque can cause a torque shuffle in the output shaft, as demonstrated in FIG. 4c. This is due to the low damping rate of the driveline. To avoid this shuffle, the input torque at the end of the shift is increased as the value of the torque multiplier is increased. This is shown at 168 in FIG. 4b. Therefore, the clutch torque at the end of the shift is more closely matched with the slipping clutch torque capacity, thus minimizing the torque impulse into the driveline.

The starter/alternator torque, as seen in FIG. 4b, then is filtered back to the desired level as requested by the vehicle system controller.

Figure 6:
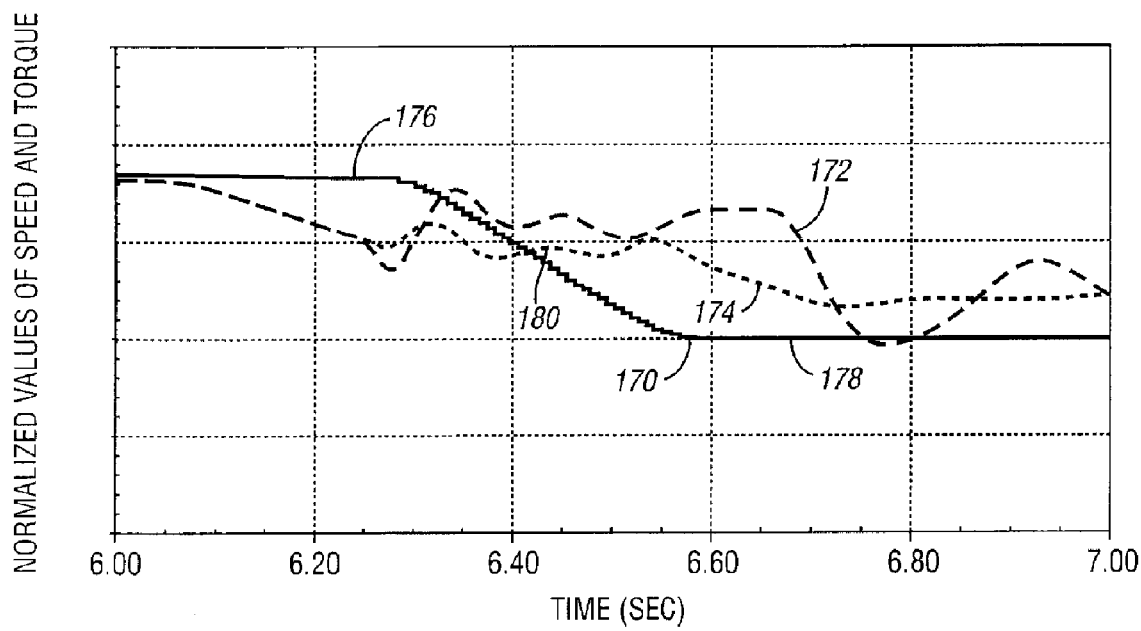
FIG. 6 is a time plot of simulated powertrain output torque, together with a speed ratio plot during a power-on upshift, wherein torque fluctuations at the output shaft for the powertrain of the invention is compared to a similar powertrain that does not include the control strategy of the invention.

FIG. 6 shows a time plot of normalized output torque and speed ratio values. The total transmission input torque is the combination of the starter/alternator torque plus the engine torque. Although there may be some delay in effecting torque modulation using starter/alternator torque and combining that torque through a control network, as indicated in FIG. 3, the response time for motor torque control is well within the requirements needed to obtain shift quality targets. Further, repeatability of the torque modulation strategy is better than that for an engine fuel control strategy and is generally comparable to a strategy that uses a controlled engine spark retard.

In FIG. 6, torque fluctuations in the torque output of the transmission, without torque modulation, are plotted at 172. The torque output fluctuations in the output shaft, when torque modulation is used, are plotted at 174. The speed ratio at 176 represents the level corresponding to a low gear ratio and the speed ratio at 178 corresponds to the upshifted value.

FIG. 6 demonstrates further that the inertia phase torque at 180 is lower than the corresponding torque for the plot for a system that does not include torque modulation.

It is the combination of the hydraulic pressure control and the motor torque control that effects a smoothing and a shaping of the output torque during power-on upshifts. As mentioned previously, the shaped output torque reduces torque shuffle at the output shaft. To schedule the computations and the output commands, the power-on upshift is separated into 5 modes. These are illustrated in FIG. 7a. The initialization mode (Mode 0), shown at 182 in FIG. 7a, is triggered when the desired gear is not the same as the value of the current gear. Variables are initialized in Mode 0 for the start of the shift.

Mode 1, shown at 184 in FIG. 7a, is entered during the next mid-ground loop execution of the transmission controller 130, shown in FIG. 3. Mode 1 lasts for a predetermined fixed time and is used to prepare the elements for pressure control. The friction element actuators are filled during Mode 1 by boosting actuator pressure to a high initial value, as shown at 186 in FIG. 7c. The pressure then is reduced sharply, as shown in FIG. 7c, to a value 188, which is a function of input speed and torque, from a table in memory.

Following the filling of the actuator for the oncoming friction element, the torque phase is entered at Mode 2, seen at 190 in FIG. 7a. This occurs after a fixed time for Mode 1 execution has expired. In Mode 2, the oncoming control pressure is commanded to ramp downward, as seen at 192 in FIG. 7c. The ramping occurs until the initial shift pressure is reached. In this way, the rate of pressure increase for the oncoming friction element is controlled. The ramping ends as the torque phase is terminated, as shown at 194 in FIG. 7c. The triggers, one of which is shown at 138 in FIG. 3, are monitored to indicate when the oncoming element has sufficient capacity to allow the release of the off-going element. At this point, the off-going pressure is commanded to a predetermined clutch stroke value.

Mode 2, at 190 in FIG. 7a, is complete after the percent ratio change has exceeded a predetermined value or a set time has expired. A percent shift complete is computed by the CPU 122, as indicated at 196 in FIG. 3.

The inertia phase, which is Mode 3 seen at 198 in FIG. 7a, contains the major portion of the speed ratio change time interval. In Mode 3, a PID controller, based on comparison of the desired oncoming slip and the actual oncoming slip, generates the oncoming pressure command. This PID control of pressure is indicated in FIG. 3 as a function of the CPU 122. This closed loop pressure control is calibrated so that the shift rate initially is high. It is decreased as the shift pressure is reduced during the inertia phase, shown at 198 of FIG. 7c. The reduced torque capacity and the resulting reduced deceleration is used to reduce the severity of shift shock that can cause shuffle after the shift is completed.

Mode 4, shown at 200 in FIG. 7a, is entered when the percentage shift complete exceeds a predetermined value. In Mode 4, the pressure is increased to the value required for non-shifting operation. This is seen in FIG. 7c at 202. This increase is achieved by an open loop control of the pressure command, as seen at 204 in FIG. 7c.

Another variable that is controlled during a power-on upshift, as mentioned previously, is the transmission input torque. The motor based torque modulation strategy of the invention uses the event-based triggers to change a start or a stop of motor torque. The response of the motor when a command for torque is made, is a relatively quick response.

In Mode 1, the maximum value of torque the motor will be commanded to absorb is determined as a function of pedal command. In Mode 2, the motor is commanded to start battery charging for absorbing torque after the start of the speed change is sensed.

In FIG. 7a, output torque (axle half-shaft torque) is plotted at 206 throughout the shift event. The engine speed is plotted at 208.

In FIG. 7c, the commanded pressure at 204 results in a measured friction element pressure at 202.

When a servo-position signal is used, as shown at 136 in FIG. 3, a plot shown at 210 in FIG. 7c is created. This plot will be an indicator of when to start using starter/alternator torque to modulate the output torque. The beginning of the inertia phase can be anticipated as the slope of plot 210 is rising.

Figure 7B:
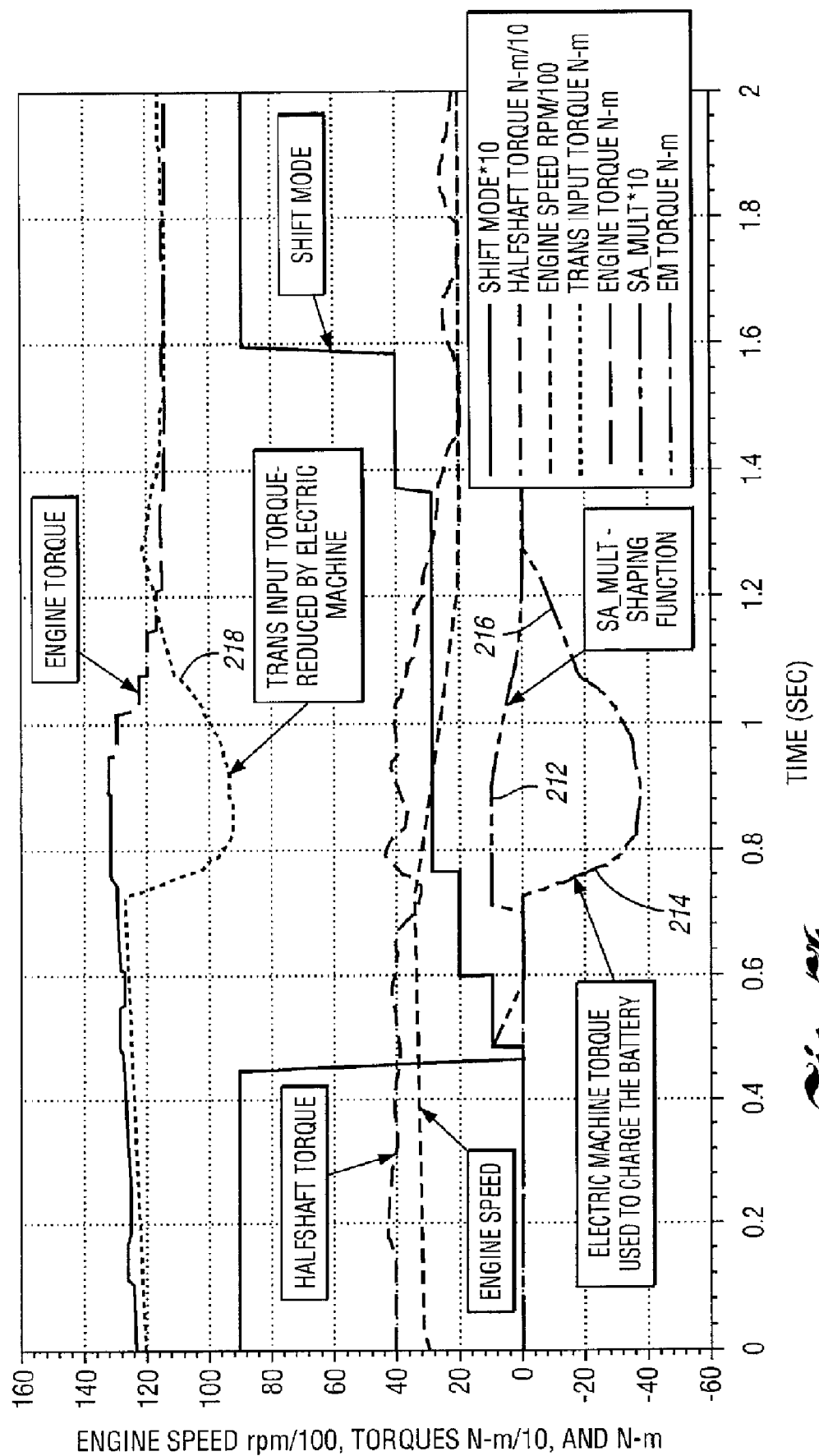
FIG. 7b is a time plot for a power-on upshift, which shows variations of engine torque, transmission input torque, transmission output torque, engine speed and motor torque for each of the shift modes.
Figure 7C:
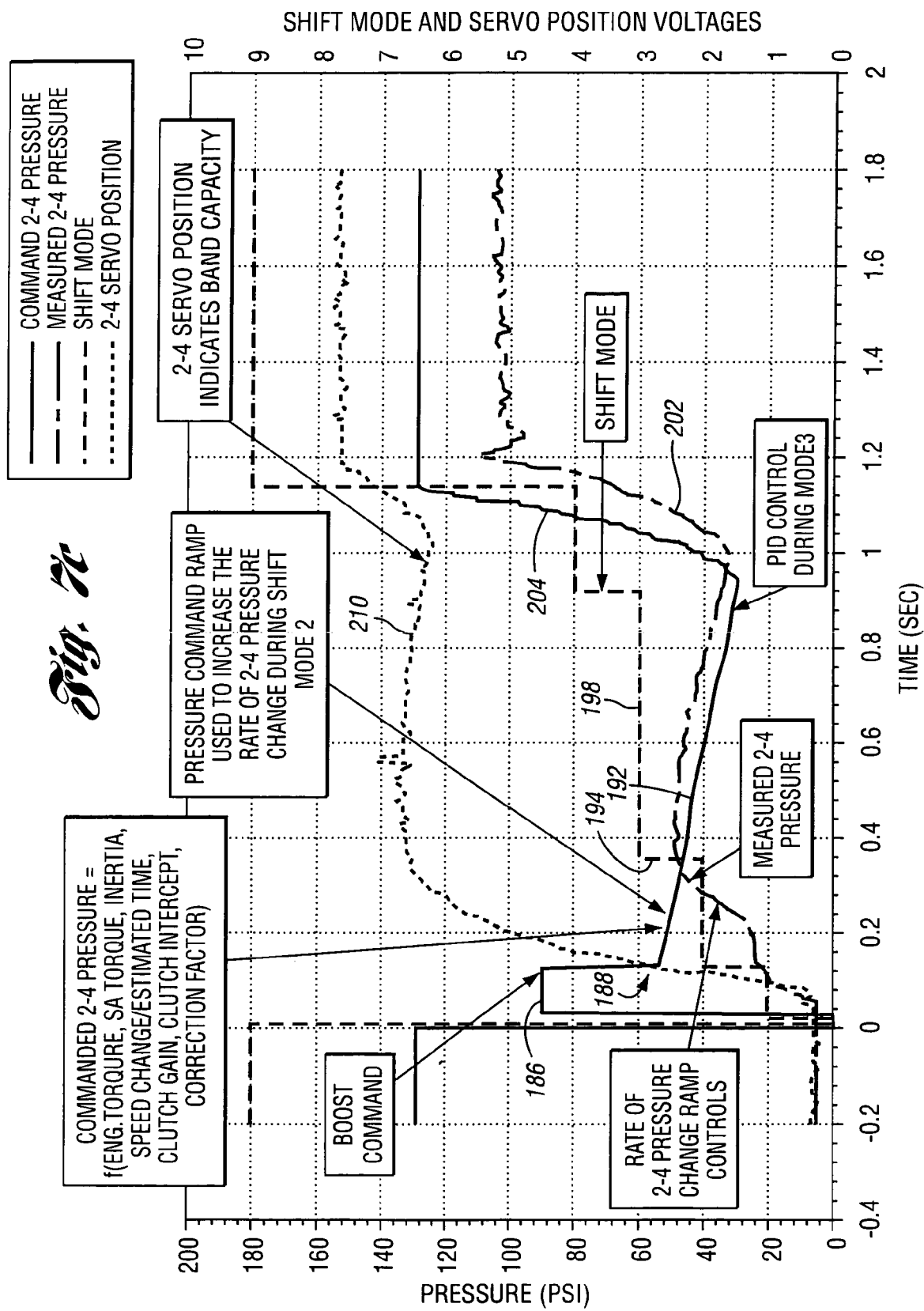
FIG. 7c is a time plot for the pressures on the friction elements during a power-on upshift event.

FIG. 7b shows a shaping function, which is used during the shift event. This function is plotted in FIG. 7b at 212. As indicated earlier, this shaping function is used to determine the actual value of torque that the motor is commanded to absorb. Thus, the motor torque used to charge the battery, which is plotted at 214 in FIG. 7b, is changed, as the shift event proceeds, by the magnitude of the shaping function. The shaping function information, as previously mentioned, is stored in memory and called out by the program counter of the CPU and used as a torque multiplier in calculating motor torque as engine torque is added to motor torque to obtain instantaneous, repetitive, input torque values.

In Mode 3, as the shift progresses, the starter/alternator is commanded to absorb less torque as shown at 216 in FIG. 7b. This restores the transmission input torque plotted at 218 in FIG. 7b to its original value. When the shift is completed, the increasing input torque reduces the shift rate at the end of the shift further mitigating the shuffle problem, previously described.

Strategy for Implementing Torque Modulation During Coasting Downshifts

The strategy for a coasting downshift is illustrated in FIGS. 8a, 8b and 8c, which are plots, respectively, of motor torque, pressure command, and input speed during a coasting downshift event. Before the start of the coasting downshift, the vehicle system controller commands the torque level of the motor based on the desired regenerative braking torque. The beginning motor torque level is indicated at 220 in FIG. 8a at the beginning of the shift. Torque control of the motor then is transferred to the transmission controller, indicated in FIG. 3, so that the shift event is coordinated with friction element control in the transmission 12.

The oncoming clutch pressure is commanded by the transmission controller to a maximum level to fill the oncoming clutch as quickly as possible, as shown at 222 in FIG. 8b. The off-going pressure is commanded to a level that is a function of input torque, as indicated in 224 in FIG. 8b. This pressure is high enough to hold the clutch just above its capacity level. Then the off-going clutch pressure is ramped down, as shown at 226 in FIG. 8b.

Motor torque is ramped from the current negative level to a lower negative level, as shown at 228 in FIG. 8a. That level is calibrated for each shift. Reducing the amount of negative regenerative braking torque in this way reduces the effort needed to bring the transmission to the downshifted gear, thus making the transition from one gear to the other more smooth. Motor torque is ramped to the new level at a rate that depends upon whether the engine is connected.

The boost mode at 222 in FIG. 8b is time-based. During the start mode 230, which is Mode 2 seen in FIG. 8a, the oncoming pressure is commanded to an open loop pressure 232, seen in FIG. 8b. That pressure command is increased if the coasting downshift is made by manually downshifting the transmission, or if the vehicle wheel brakes are applied.

During a downshift, it is expected that the transmission input speed will increase. If the off-going element losses capacity before the oncoming element is capable of holding input torque, the input speed will decrease due to the negative torque load of the motor. A reduction in input speed is an indicator of off-going friction element slip. The off-going friction element pressure ramp continues until off-going friction element slip is detected or oncoming capacity is detected.

The motor torque ramp, shown at 234, continues through the boost mode, the start mode and the inertia mode, as shown at 236 in FIG. a, until the desired torque is reached, as shown at 228 in FIG. 8a. It is held at that level until it is requested to return beginning at point 238 in FIG. 8a. The level of motor torque is a calibratable function for each shift.

The end of the start mode is detected through detection of oncoming clutch capacity. When the oncoming clutch has capacity, the transmission input speed direction will begin to move toward the speed at the downshifted speed ratio. This is seen in FIG. 8c at 239. Once a calibratable percentage of shift is completed or a time-out occurs, the start mode is completed.

In the inertia mode, oncoming pressure is commanded through a closed loop PID controller to follow a speed profile to the downshifted gear. This is indicated at 240 in FIG. 8b. There is a minimum clip on the pressure command, as shown at 242 in FIG. 8b, which would be raised to make the coast shift more aggressive under two conditions: first, during a manual downshift, an aggressive feel is desired so that the vehicle noticeably slows in response to the driver's desire for hill braking; second, under fast vehicle deceleration, the shift needs to be completed faster and a more aggressive shift rate is acceptable.

At the beginning of the start mode, the off-going clutch is commanded off. The motor torque is expected to be at a level needed to complete the ratio change. As the shift advances toward completion, the motor torque is decreased, as shown at 244 in FIG. 8a, toward the original torque level that was commanded at the start of the shift. The point 238 at which the down slope is begun is a function of percentage shift complete. To make the down slope responsive to vehicle deceleration rate, the down slope rate is a function of percentage shift complete.

The inertia mode is exited when the percentage shift complete is near 100%. In the end mode 246 in FIG. 8a, the oncoming pressure command is increased through a parabolic filter to the maximum command. This is seen at 248 in FIG. 8b. At the completion of the shift, motor control is returned to the vehicle system controller.

Figure 9:
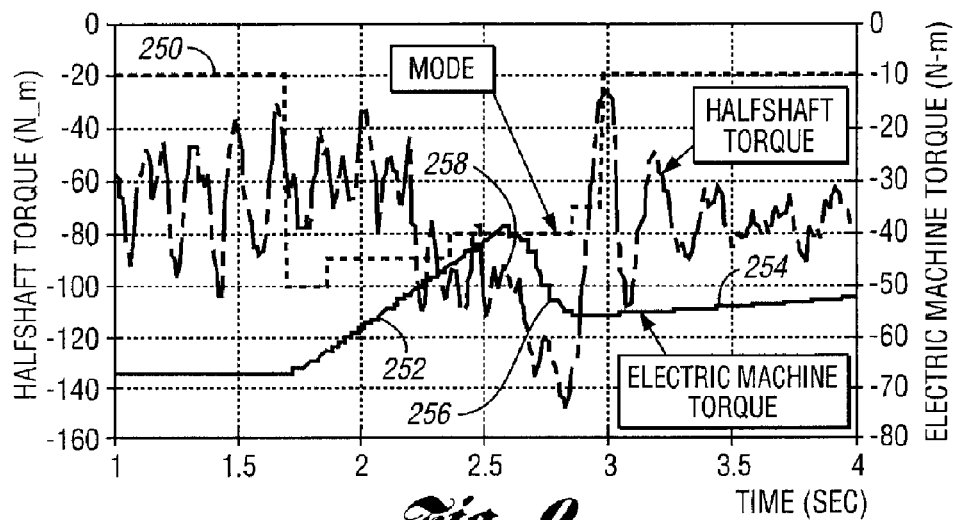
FIG. 9 is a time plot of the output torque during a coasting downshift.
Figure 10:
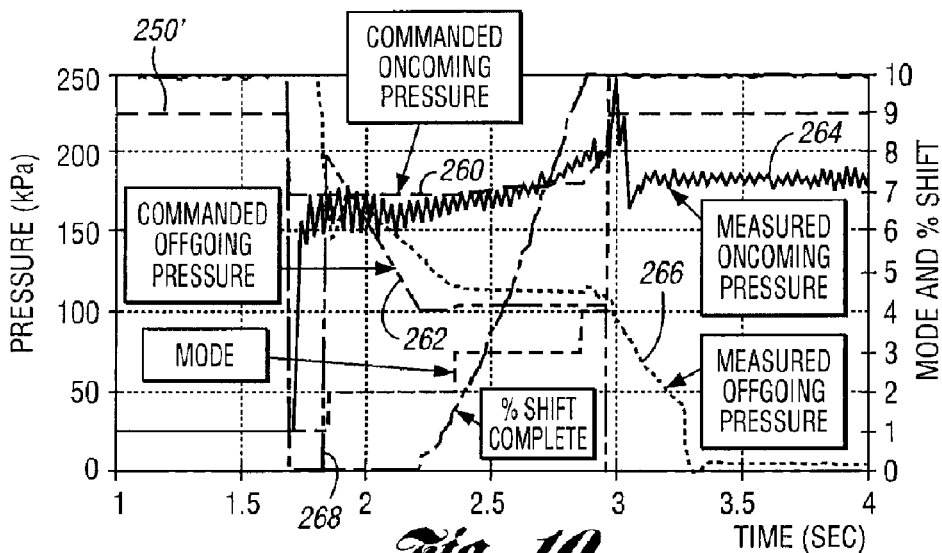
FIG. 10 is a time plot of the pressure on the oncoming clutch and the off-going clutch during a coasting downshift.
Figure 11:
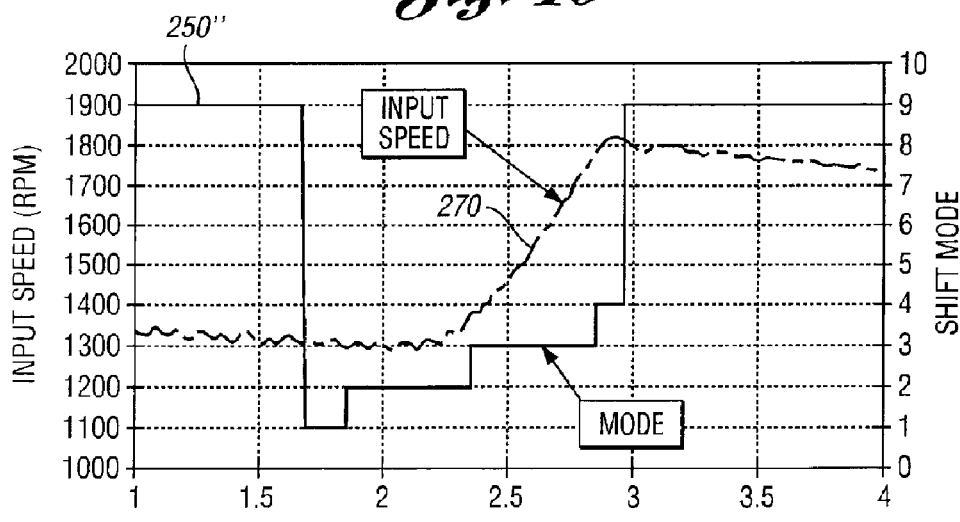
FIG. 11 is a time plot of transmission input speed during a coasting downshift.

FIGS. 9, 10 and 11 illustrate data for an actual 4-3 coasting downshift. In order to correlate the events that are illustrated in FIGS. 9, 10 and 11 with the shift modes illustrated in FIGS. 8a, 8b and 8c, the plots of FIGS. 9, 10 and 11 include mode plots 250, 250' and 250", respectively. FIG. 9 shows a motor torque profile, which linearly increases, as shown at 252. Torque is requested to increase throughout the first two modes and does not reach its steady-state value until the shift is near completion at 254. Mid-way through the inertia phase, the motor torque is brought back down near the value needed for the downshifted ratio as seen at 256. The output torque, before and after the coasting downshift, is at approximately the same level with minimum disturbance during the inertia phase. This is shown at 258.

FIG. 10 shows the profile of the oncoming commanded pressure at 260 and the off-going commanded pressure at 262, as well as the actual pressures 264 and 266 corresponding, respectively, to the commanded pressures 260 and 262. The off-going friction element in the case of FIGS. 9, 10 and 11 is the 2-4 shift command. The off-going friction element pressure command is set to zero during the boost phase, as seen at 268 in FIG. 10, in order to speed its response. The forward clutch is the oncoming element in the case of a 4-3 coasting downshift. Its response is fast, so less boost is needed.

FIG. 11 shows the change in input speed for this 4-3 coasting downshift. Input speed varies smoothly from the fourth ratio level to the third ratio level, as seen at 270.

Although an embodiment of the invention has been described, it will be apparent to persons skilled in the art that modifications may be made without departing from the scope of the invention. All such modifications and equivalents thereof are intended to be defined by the following claims.

What is claimed is:

1. A method for controlling engagement and release of pressure-actuated torque establishing friction elements during a power-on upshift of a multiple-ratio transmission in a hybrid electric vehicle powertrain having an engine, an electric motor and a battery, the motor being disposed in a power flow path between the engine and a power input element of the transmission as driving power is delivered to a transmission power output member, and an electronic controller responsive to powertrain operating variables for controlling actuating pressure for the friction elements by releasing actuating pressure for an off-going friction element in synchronism with increasing actuating pressure for an oncoming friction element during a power-on upshift event, the method comprising the steps of:

increasing oncoming friction element actuating pressure at the beginning of the power-on upshift event;

reducing actuating pressure for the off-going friction element during a torque phase of the power-on upshift;

increasing electric motor torque during the torque phase; and reducing electric motor torque during an inertia phase of a power-on upshift whereby torque variations in the transmission power output member are modulated.

2. The method set forth in claim 1 wherein the step of increasing electric motor torque comprises obtaining a torque multiplier stored in controller memory during each control loop of the electronic controller; and multiplying motor torque by the multiplier during the torque phase to increase effective motor torque during the torque phase.

3. The method set forth in claim 1 wherein the step of reducing electric motor torque during the inertia phase comprises obtaining a torque multiplier stored in controller memory during each control loop of the electronic controller; and multiplying motor torque during the inertia phase to decrease effective motor torque during the inertia phase.

4. The method set forth in claim 2 wherein an effective torque in the transmission power output member at the end of the power-on upshift is the algebraic sum of motor torque and engine torque multiplied by instantaneous transmission speed ratio.

5. The method set forth in claim 3 wherein an effective torque in the transmission power output member at the end of the power-on upshift is the algebraic sum of motor torque and engine torque multiplied by instantaneous transmission speed ratio.

6. The method set forth in claim 1 including the steps of determining a time during a power-on upshift event when the oncoming friction element achieves torque establishing capability; and controlling oncoming friction element pressure during the inertia phase using a commanded closed loop pressure.

7. The method set forth in claim 6 including the step of detecting the end of the inertia phase; and increasing the commanded pressure on the oncoming friction element to effect full oncoming clutch capacity at the end of a power-on upshift event.

8. The method set forth in claim 7 wherein the step of increasing the commanded pressure on the oncoming friction element occurs as the oncoming clutch becomes fully engaged following slipping of the oncoming clutch whereby an effect of a change in oncoming friction element dynamics is modified thus reducing torque fluctuation in the torque output member.

9. The method set forth in claim 8 including a step of increasing the commanded pressure on the oncoming friction element prior to the torque phase followed by a return of the commanded pressure on the oncoming friction element to an initial pressure value at the start of a power-on upshift event.

10. A control system for controlling ratio changes in a multiple-ratio transmission in a hybrid electric vehicle powertrain, the transmission having selectively-engageable, pressure-actuated torque establishing friction elements for effecting powertrain upshifts;

the powertrain having an engine, an electric motor and a battery, the motor being disposed in a power flow path between the engine and a power input member of the transmission as driving power is delivered to a power output member;

the control system comprising an electronic controller responsive to powertrain operating variables for controlling actuating pressure for the friction elements;

the control system controller being configured to control actuating pressure for the friction elements by releasing actuating pressure for an off-going friction element in synchronism with increasing actuating pressure for an oncoming friction element during a power-on upshift;

the motor being disposed in series relationship with respect to the engine and the transmission; and the control system including means for increasing motor torque during a torque phase and reducing motor torque during an inertia phase of a power-on upshift of the transmission.

\* \* \* \* \*